A. H. MORREL.
Rotary Cultivator.
No. 12,690.  Patented Apr. 10. 1855.
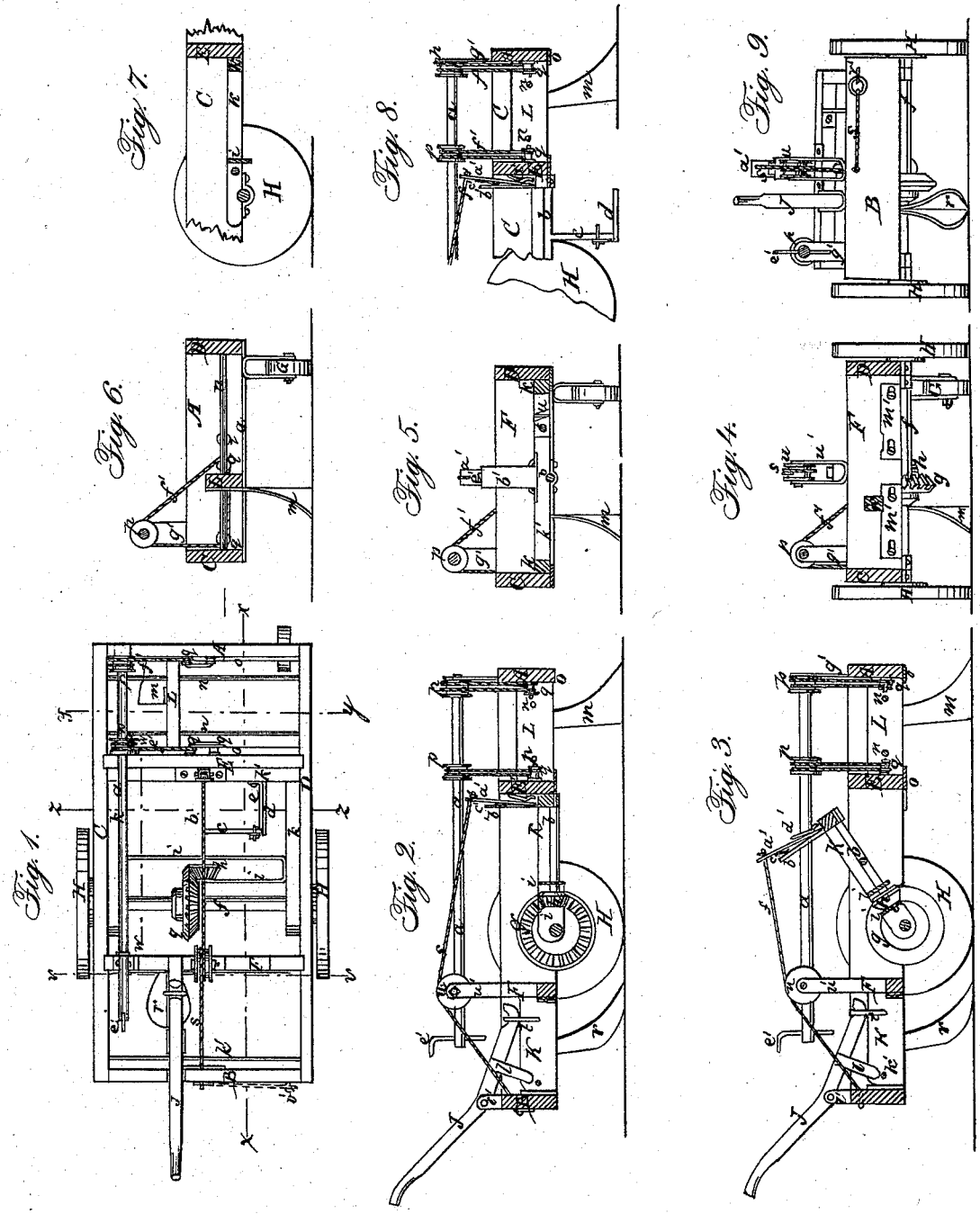

UNITED STATES PATENT OFFICE.

A. H. MORREL, OF MARLIN, TEXAS.

IMPROVEMENT IN CULTIVATORS.

Specification forming part of Letters Patent No. 12,690, dated April 10, 1855.

*To all whom it may concern:*

Be it known that I, A. H. MORREL, of Marlin, in the county of Falls and State of Texas, have invented a new and useful Improvement in Cultivators; and I do hereby declare that the following is a full and exact description thereof, reference being had to the accompanying drawings, making a part of this specification—

Figure 1 being a top view of my improved cultivator; Fig. 2, a longitudinal section in the line $x\ x$ of Fig. 1; Fig. 3, a longitudinal section in the same line, showing some of the parts of the cultivator in a different position from that represented in Fig. 2; Fig. 4, a transverse section in the line $v\ v$ of Fig. 1; Fig. 5, a transverse section in the line $z\ z$ of Fig. 1; Fig. 6, a transverse section in the line $y\ y$ of Fig. 1; Fig. 7, a partial longitudinal section in the line $w\ w$ of Fig. 1; Fig. 8, a partial longitudinal section in the line $x\ x$ of Fig. 1, showing some of the parts in a different position from what they are shown in the other drawings; and Fig. 9 is an elevation of the rear end of the machine.

Similar letters indicate like parts in all the figures.

My improved cultivator is adapted particularly to the thinning out of superfluous cotton-plants and the cultivation of the remaining plants, but can be used for cultivating corn.

Before describing my invention I would observe that cotton-seeds are sown continuously in drills, and after the plants have attained to the height of from two to six inches a portion of them are removed with a hoe, so as to leave the cotton that is to be cultivated in separate clusters of the proper number of plants—generally from four to ten. The proper number must depend upon the age of the plant and the nature of the soil.

My improved cultivator is so arranged that the operator can first laterally and transversely thin out the cotton-plants, so as to leave the proper number of plants standing, and then pulverize the earth and draw it up about the said remaining cotton-plants all at one operation.

The frame of my improved cultivator is composed of the ends A B, the sides C D, and the transverse pieces E F. The said frame is supported upon the axle $f\ f$ and the wheels H H. Between the front end, A, and the transverse piece E of the frame I locate the movable point or points $m$, for removing the superfluous plants from the side or sides of the row. The point $m$ is of the shape of the ordinary plow-point, and is attached to a shank of proper size and strength, which descends from the movable beam L. The beam L rests upon the plates $o\ o$, which are secured to and project inward from A and E. The said beam has also an additional support in the rods $n\ n$, which pass through the same and are secured to the sides of the frame. The beam L can be readily moved out or in, for the purpose of enabling the point attached to it to remove the plants from the side of a row when they stand too thickly, by means of the cords $f'f'$, which are connected to the ends of said beam and pass over the pulleys $q\ q$, which work on axles that project from the parts A and E of the frame and the pulleys $p\ p$ on the longitudinal shaft $a$. The said shaft $a$ is supported by the standards $g'\ g'$, and extends to the rear part of the cultivator, where it has a crank-handle, $e'$, within convenient reach of the operator, by which he can turn the shaft and move the beam L out or in, as circumstances may require. The beam L can be moved in far enough to enable the point $m$ to cut out a portion of the plants in the row that the cultivator is made to pass centrally over; or it may be moved out far enough to throw the earth upon the roots of the plants in the adjoining row.

Between the transverse pieces E F of the cultivator-frame I arrange the supporting-frame $i\ k\ k'$ of the rotating knife $d$ in such a manner that as the cultivator is drawn forward the said knife will be rotated, while its frame is so completely under the control of the operator that by drawing the cord $s$ the said knife-frame can be thrown upward far enough to cause the said knife to rotate entirely above the tops of the plants, as shown in Fig. 3, and by allowing the said knife-frame to fall into the position shown in Figs. 1, 2, and 8 the said knife will at proper intervals be made to cut the plants up below the surface of the ground.

The knife-frame is composed of the side pieces, $k\ k$, the front transverse piece, $k'$, and the metallic plate $i$, or their equivalents, united to each other, substantially as represented in Fig. 1. The rear ends of the sides $k$ $k$ of the knife-frame rest upon the axle $f$, and are secured thereto in such a manner that the frame may be vibrated on said axle. The knife $d$ is secured to the end of the arm $c$, which projects from the shaft $b$. The said shaft $b$ is so arranged as to be parallel with the sides C D of the frame of the cultivator, and is placed midway between them, as represented in Fig. 1. The shaft $b$ is rotated by means of the pinion $h$ on its rear end and the cog-wheel $g$ on the axle $f$. When the knife-frame is thrown into the position shown in Fig. 2 it is caught and retained by the catch $d'$, which is forced into a notch in the transverse piece E of the cultivator-frame by the action of the spring $c'$, as represented in Fig. 2. The said spring $c'$ is secured to the standard $b'$, which rises from the end $k'$ of the knife-frame and bears against the plate $a'$ immediately in front of it. The said plate $a'$ and catch $d'$ form but one piece, which is hinged at its lower extremity in such a manner that it may be moved freely back and forth. The cord $s$ is connected to the upper end of $a'$, so that by pulling upon said cord it will be perceived that the catch $d'$ will first be drawn out of the notch in the transverse piece E of the cultivator-frame, and then the knife-frame be drawn upward into the position shown in Fig. 3, where it may be retained by slipping the ring on the end of the cord $s$ onto the hook $v'$, which projects from the rear end piece, B, of the cultivator-frame.

Between the hind end, B, of the cultivator-frame and the transverse piece F, I arrange a cultivating-point, $r$, and its beam K, as represented in Figs. 1, 2, 3, and 4—to wit, the rear end of said beam K is hinged to the transverse rod $k$ in such a manner that it can be freely vibrated on said rod, and also be moved laterally upon the same. The front end of K, when in a position for operating the point $r$, is received into a notch in the plate $m'$, as shown in Fig. 4. The said plate $m'$ is secured to the rear side of E by means of set-screws passing through slots in said plate into the cross-piece F, as shown in Fig. 4, by which the said plate can be secured in different positions upon F. The handle J, by which the beam K is managed and governed, is connected to the front end of said beam by means of the stirrup $t$, and the said lever works in a swivel-joint, $l'$, secured in proper bearings upon the top of the rear end, B, of the machine. It will therefore be perceived that the front end of the beam K can at any moment be elevated and moved to the right or left by the operator.

In the drawings, the beam K of but one cultivating-point $r$ and the beam L of but one laterally-thinning point $m$ are represented as combined with the rotating cutter $d$ in one machine; but I shall generally construct my cultivators with the beams of two cultivating-points and the beams of two thinning-points arranged on either side of the machine, substantially as herein set forth, so that the surplus plants can be removed at intervals from a row, and also be removed from either or both sides of the same, and then the earth be pulverized and drawn up to the plants that are left standing.

When my improved cultivator is used for cultivating corn the frame of the rotating cutter $d$ should be detached from the machine.

In operating my improved cultivator the operator can at any time throw up the forward end of the machine by bearing his weight upon the rear end of the machine, and thus obviate coming in contact with any obstruction that might injure the thinning-cutters.

The stationary knife $e$, which is secured to the transverse piece E of the cultivator-frame, serves the purpose of cleaning the rotating knife $d$, as it passes in close proximity to the said stationary knife during its revolutions.

I am aware that rotary cutters and laterally-adjustable shares have been separately used in cultivators, and therefore

What I claim as my invention, and desire to secure by Letters Patent in my improved cultivator, is—

1. The combination of the adjustable thinning-point (or points) $m$ at the forward end of the cultivator with the adjustable cultivating-point (or points) $r$ at the rear end of the cultivator, substantially as herein set forth.

2. Combining the rotating cutter $d$ with the laterally-adjustable thinning-point (or points) $m$ and the cultivating-point (or points) $r$, substantially in the manner and for the purpose herein set forth.

The above specification of my new and useful improvement in cultivators signed and witnessed this 9th day of February, 1855.

A. H. MORREL.

Witnesses:
GEO. W. ADAMS,
Z. C. ROBBINS.